J. F. O'CONNOR.
FRICTION GEAR.
APPLICATION FILED MAR. 30, 1917.
1,307,309.
Patented June 17, 1919.
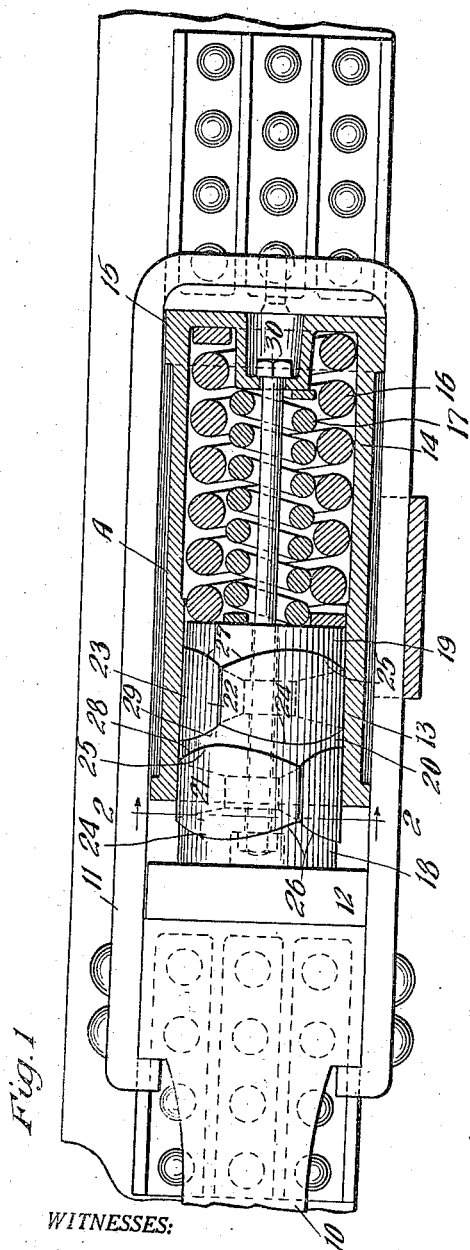
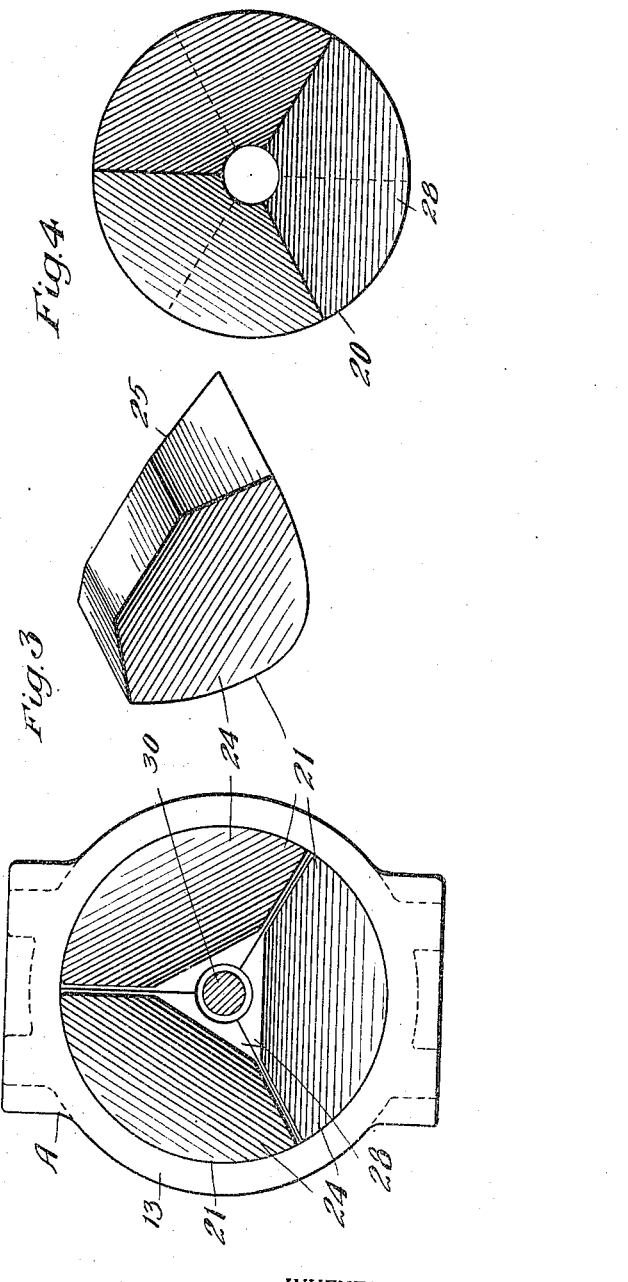
WITNESSES:
Wm. Geiger
INVENTOR.
John F. O'Connor
BY George I. Haight
ATTORNEY

UNITED STATES PATENT OFFICE.

JOHN F. O'CONNOR, OF CHICAGO, ILLINOIS, ASSIGNOR TO WILLIAM H. MINER, OF CHAZY, NEW YORK.

FRICTION-GEAR.

1,307,309.  Specification of Letters Patent.  Patented June 17, 1919.

Application filed March 30, 1917. Serial No. 158,494.

*To all whom it may concern:*

Be it known that I, JOHN F. O'CONNOR, a citizen of the United States, residing at Chicago, in the county of Cook and State of Illinois, have invented a certain new and useful Improvement in Friction-Gears, of which the following is a full, clear, concise, and exact description, reference being had to the accompanying drawings, forming a part of this specification.

This invention relates to improvements in friction gears.

One object of the invention is to provide a friction gear of high capacity and certain release wherein multiple sets of friction shoes and wedges are employed to operate in tandem.

Another object of the invention is to provide a friction gear wherein are employed two sets of friction elements, each set including a plurality of friction shoes and opposed wedges coöperating with the shoes.

In the drawing forming a part of this specification, Figure 1 is a longitudinal sectional view of a portion of a draft rigging showing my improvements in connection therewith. Fig. 2 is an end elevational view of the gear proper, with the outer wedge block removed, the connecting bolt being shown in section. Fig. 3 is a perspective view of one of the friction shoes. And Fig. 4 is an elevational view of the middle wedge member.

In said drawing, 10 denotes a draw bar to which is riveted a yoke 11 of the usual form and within which is confined the gear proper and a coöperating front follower 12. As will be understood, the gear is mounted between the usual draft sills of a car and coöperate with the customary stops.

The improved friction gear, as shown, comprises a casting A having a cylindrical friction shell proper 13, spring casing 14 and integral rear follower 15. Mounted within the spring casing 14 is a spring consisting of an outer heavy coil 16 and an inner lighter coil 17. Coöperable with the friction shell is my improved friction device consisting of an outer wedge block 18, an inner wedge block 19, an intermediate wedge block 20, an outer set of friction shoes 21—21 and an inner set of friction shoes 22—22. Each of the friction shoes 21 and 22 is provided with an outer cylindrical surface 23 to coöperate with the interior friction surface of the shell and oppositely inclined wedge faces 24 and 25. The outer wedge block 18 which bears against the front follower 12 is provided on its inner face with a series of wedge faces 26 which engage the adjacent wedge faces of the outer set of friction shoes 21. The inner wedge block 19 is provided with a similar set of wedge faces 27 on the side adjacent the draw bar and which coöperate with the corresponding wedge faces 25 of the inner set of friction shoes 22. The intermediate wedge block 20 is provided on its front face with a series of wedge faces 28 that coöperate with the wedge faces 25 of the front set of friction shoes 21 and, on its rear side, with another series of wedge faces 29 that coöpearte with the adjacent wedge faces 24 of the rear set of the friction shoes 22. As apparent from the drawing, the inner wedge block 19 bears directly against the spring. All the parts are held in assembled relation and the spring under an initial compression by a retaining bolt 30. As appears from the drawing, the wedge faces of the front set of friction shoes and wedges coöperating therewith are angularly offset with respect to the wedge faces of the rear set of friction shoes, the amount of angular offset depending upon the number of shoes employed. Where three shoes are employed in each set, as shown in the drawing, the faces of the second set will be angularly offset approximately 60° so that a well distributed radial pressure is produced against the friction shell.

From the preceding description, it will be seen that in operation, when pressure is applied to the front wedge block 18, the front set of friction shoes will be forced outwardly and will be resisted by the intermediate wedge block 20. The latter in turn is resisted by the rear set of friction shoes 22, the shoes 22 being in turn resisted by the inner wedge block 19. In effect, there are two sets of friction elements, each set comprising three friction shoes and a pair of opposed wedges, one on the outer and one on the inner side of each set of shoes. Instead of making the intermediate wedge blocks separate, I prefer to make them integral, as shown in the intermediate wedge block 20, and at the same time offset the wedge faces angularly, as above described. By this arrangement of the solid intermediate wedge block, the maintenance of the sets of wedge faces in their angularly offset position is positively insured. By employing the opposed wedges with each set of friction shoes, it is apparent that the shoes will be pressed outwardly uniformly and not have the pressure concentrated thereon at any particular point. Furthermore, inasmuch as the tandem arranged sets of the friction elements multiply the resistance, I am enabled to employ relatively blunt wedging angles to produce the necessary capacity and which blunt angles, as well known to those skilled in the art, will permit of certain release.

I claim:

In a friction gear, the combination with a friction shell and a spring resistance, of tandem arranged sets of friction elements coöperable with the shell, each set including a series of friction shoes and a pair of opposed wedges co-acting therewith, one wedge of one set being rigid with respect to another wedge of the other set, the wedge faces of one set being angularly offset with respect to the wedge faces of the other set.

In witness that I claim the foregoing I have hereunto subscribed my name this 27th day of March, 1917.

JOHN F. O'CONNOR.

Copies of this patent may be obtained for five cents each, by addressing the "Commissioner of Patents, Washington, D. C."